(12) United States Patent
Donati et al.

(10) Patent No.: US 11,080,482 B2
(45) Date of Patent: Aug. 3, 2021

(54) SMART MEAL PREPARATION USING A SENSOR-ENABLED KITCHEN ENVIRONMENT

(71) Applicant: International Business Machines Corporation, Armonk, NY (US)

(72) Inventors: Michael Donati, Billerica, MA (US); Nadiya Kochura, Bolton, MA (US); Scott L. Sachs, Washington, NC (US); Fang Lu, Billerica, MA (US)

(73) Assignee: International Business Machines Corporation, Armonk, NY (US)

( * ) Notice: Subject to any disclaimer, the term of this patent is extended or adjusted under 35 U.S.C. 154(b) by 90 days.

(21) Appl. No.: 16/357,673

(22) Filed: Mar. 19, 2019

(65) Prior Publication Data

US 2020/0302012 A1   Sep. 24, 2020

(51) Int. Cl.
```
G06F 40/205      (2020.01)
A23L 5/00        (2016.01)
A47J 39/00       (2006.01)
H04L 12/28       (2006.01)
G10L 13/08       (2013.01)
```

(52) U.S. Cl.
CPC ............ *G06F 40/205* (2020.01); *A23L 5/00* (2016.08); *A47J 39/006* (2013.01); *G10L 13/08* (2013.01); *H04L 12/2814* (2013.01); *H04L 2012/285* (2013.01)

(58) Field of Classification Search
USPC .............................................. 704/7–10, 257
See application file for complete search history.

(56) References Cited

U.S. PATENT DOCUMENTS

| | | | |
|---|---|---|---|
| 5,218,527 | A | 6/1993 | Ishikawa |
| 8,145,854 | B1 | 3/2012 | Lee |
| 2013/0007615 | A1 | 1/2013 | Goldman |
| 2013/0226716 | A1 | 8/2013 | Balassanian |
| 2014/0272816 | A1 | 9/2014 | Callahan |
| 2015/0230664 | A1* | 8/2015 | Freas, II ............ B65D 81/3484 366/138 |

(Continued)

OTHER PUBLICATIONS

"Dinner Timing: How to make sure everything is ready at the same time," Life as a Strawberry, Aug. 3, 2017, 7 pages. <http://www.lifeasastrawberry.com/dinner-timing/>.

(Continued)

*Primary Examiner* — Leonard Saint Cyr
(74) *Attorney, Agent, or Firm* — Jeffrey M. Ingalls

(57) ABSTRACT

A computer receives one or more recipes related to a meal. The computer analyzes the one or more recipes using natural language processing to identify a plurality of ingredients of the one or more recipes. The computer analyzes the one or more recipes using natural language processing to identify a plurality of steps to prepare each of the one or more recipes. The computer receives sensor input to identify a kitchen layout including locations of one or more devices for preparing the one or more recipes. The computer determines a plurality of parameters of a meal preparation plan based on the identified plurality of ingredients, the identified plurality of steps, and the identified kitchen layout, wherein the one or more parameters includes an order of meal preparation. The computer outputs the meal preparation plan to a user.

20 Claims, 6 Drawing Sheets

(56) References Cited

U.S. PATENT DOCUMENTS

| | | | | |
|---|---|---|---|---|
| 2016/0174748 A1* | 6/2016 | Baldwin | ............... | A47J 36/321 |
| | | | | 426/231 |
| 2018/0257219 A1* | 9/2018 | Oleynik | ................. | B25J 9/0081 |
| 2018/0308066 A1 | 10/2018 | Hadatsuki | | |
| 2019/0125120 A1* | 5/2019 | Jenkins | ................. | A47J 36/321 |
| 2019/0231113 A1* | 8/2019 | Young | ................. | G05B 19/042 |
| 2019/0277754 A1* | 9/2019 | Frielinghaus | ............. | A23L 5/30 |

OTHER PUBLICATIONS

"How do restaurant chefs manage to serve multiple dishes to different people at the table at the same time, when it is clear that the preparation time is different for all of them?," Quora, printed Mar. 15, 2019, 3 pages. <https://www.quora.com/How-do-restaurant-chefs-manage-to-serve-multiple-dishes-to-different-people-at-the-table-at-the-same-time-when-it-is-clear-that-the-preparation-time-is-different-for-all-of-them>.

"Natural Language Understanding," IBM, printed Mar. 15, 2019, 4 pages. <https://www.ibm.com/watson/services/natural-language-understanding/>.

"Watson Text to Speech," IBM, printed Mar. 15, 2019, 2 pages. <https://www.ibm.com/cloud/watson-text-to-speech>.

"Watson Visual Recognition," IBM, printed Mar. 15, 2019, 3 pages. <https://www.ibm.com/watson/services/visual-recognition/>.

Mell et al., "The NIST Definition of Cloud Computing," Recommendations of the National Institute of Standards and Technology, U.S. Department of Commerce, Special Publication 800-145, Sep. 2011, 7 pgs.

* cited by examiner

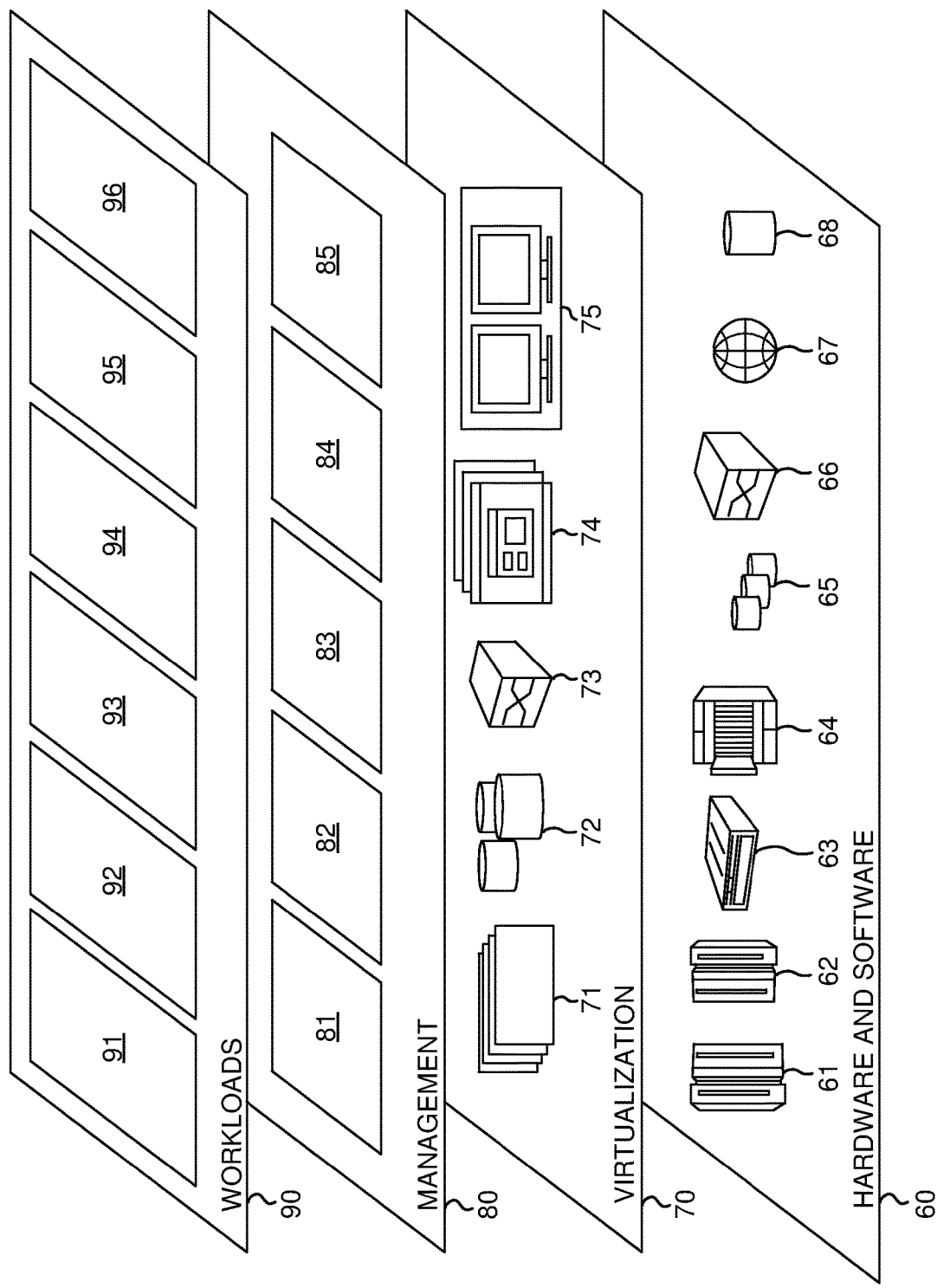

SMART MEAL PREPARATION USING A SENSOR-ENABLED KITCHEN ENVIRONMENT

BACKGROUND

Meal preparation typical involves a person manually determining, based upon the various dishes to be prepared, which ingredients, utensils, cookware, and appliances are necessary to prepare the desired meal. Additionally, the person cooking must determine which tasks to perform in which order, such that the meal can be ready to serve at the desired time. In circumstances where multiple dishes are to be prepared for a meal, this can include balancing many aspects of preparing a meal in the correct order to ensure that the food items are at an appropriate temperature and freshness when the meal is to be served.

SUMMARY

Disclosed herein are embodiments of a method, system, and computer program product for smart meal preparation planning using a sensor-enabled kitchen environment. A computer receives one or more recipes related to a meal. The computer analyzes the one or more recipes using natural language processing to identify a plurality of ingredients of the one or more recipes. The computer analyzes the one or more recipes using natural language processing to identify a plurality of steps to prepare each of the one or more recipes. The computer receives sensor input to identify a kitchen layout including locations of one or more devices for preparing the one or more recipes. The computer determines a plurality of parameters of a meal preparation plan based on the identified plurality of ingredients, the identified plurality of steps, and the identified kitchen layout, wherein the one or more parameters includes an order of meal preparation. The computer outputs the meal preparation plan to a user.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 6 depicts abstraction model layers according to some embodiments of the present disclosure.

Figure 1:
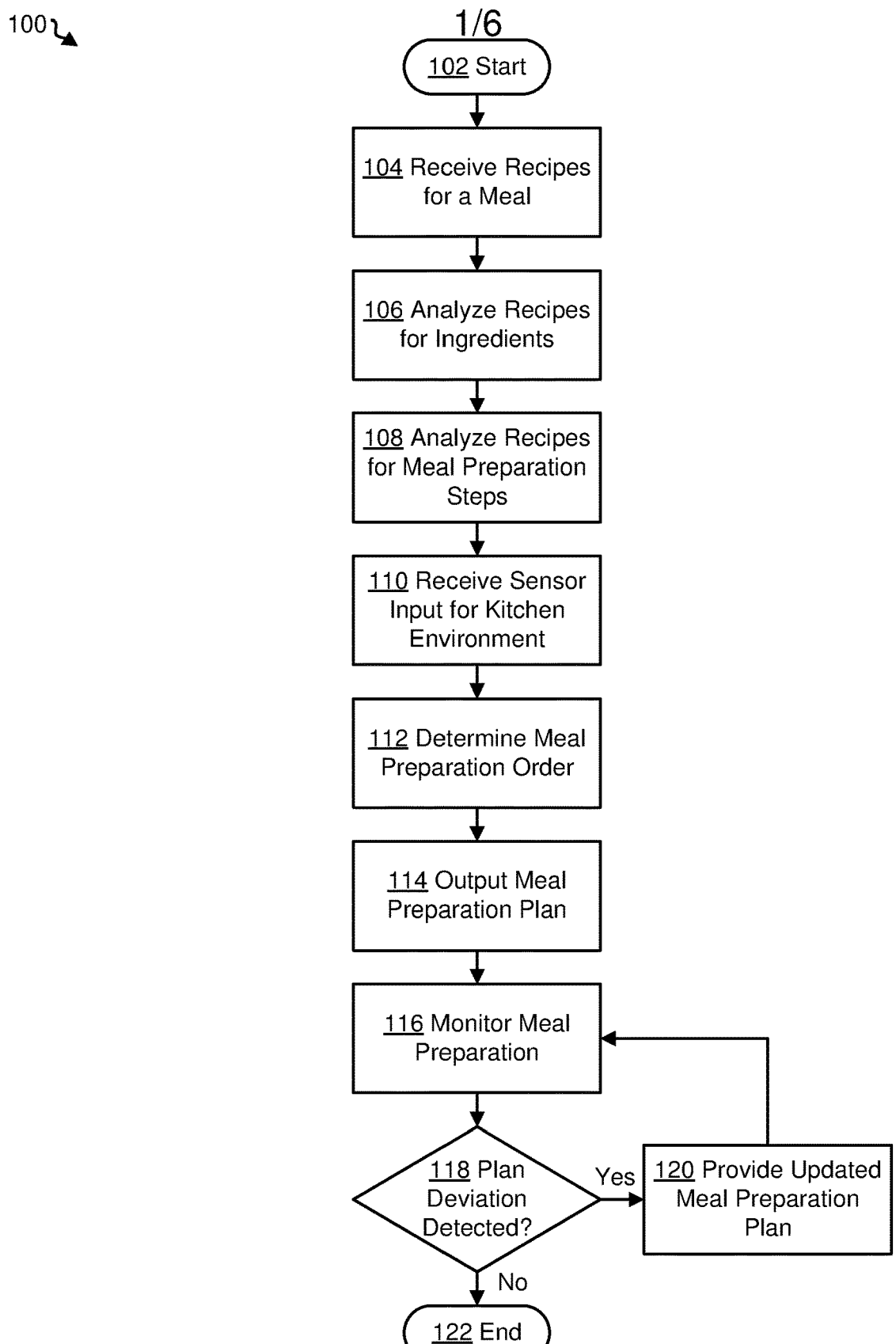
FIG. 1 depicts an example method for smart meal preparation using a sensor-enabled kitchen environment, in accordance with embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure relate generally to meal preparation, and more specifically, to smart meal preparation planning using a sensor-enabled kitchen environment. While the present disclosure is not necessarily limited to such applications, various aspects of the disclosure can be appreciated through a discussion of various examples using this context.

In many situations, meal preparation typically involves a person manually determining, based upon one or more dishes to be prepared, which ingredients, utensils, cookware, and appliances are necessary to prepare the desired meal. Additionally, the person cooking must determine which tasks to perform in which order, such that the meal can be ready to serve at the desired time. This can occur in an individual's home, a restaurant environment, or any other environment where meal preparation occurs. The amount of complexity involved can depend on the number of dishes to be prepared and may increase with the number of people to be served the meals. In environments with more than one person involved in the cooking or preparation, this can include balancing workloads such that appropriate tasks can be performed simultaneously, or more than one person can work on a task. In circumstances where multiple dishes are to be prepared for a meal, this can include balancing many aspects of preparing a meal in the correct order to ensure that the food items are at an appropriate temperature and freshness when the meal is to be served.

Embodiments of the present disclosure provide for a method, system, and computer program product for smart meal preparation planning using a sensor-enabled kitchen environment. Using sensor based smart tags or similar technology, components of a kitchen can be tracked with sensors to determine in real time where various appliances, utensils, and/or cookware are located. Additionally, a system can receive and process recipes for one or more meals including analyzing the recipes for ingredients necessary for the meals and determining which meal preparation steps are required for preparing the meals. Using these inputs, the smart meal preparation system can determine a meal preparation order and output a meal preparation plan. This order can detail the steps involved, which portion of the kitchen it can be performed in, which appliances, utensils, and/or cookware are required, and more. One or more users who will be preparing the meal can use the output to engage in meal preparation. The system can monitor the progress of meal preparation using the sensors and provide updated meal preparation plans as necessary.

A smart meal preparation system and process as described herein provide advantages over prior methods of providing assistance to users engaged in meal preparation. As disclosed herein, many aspects of a kitchen environment can be automatically tracked and monitored for real time performance improvement. Additionally, the use of a smart meal preparation system can assist a user who may be inexperienced in meal preparation and unable to determine an optimal plan to result in all dishes of a meal being complete at or about the same time. These improvements and/or advantages are a non-exhaustive list of example advantages.

Embodiments of the present disclosure exist which can contain none, some, or all of the aforementioned advantages and/or improvements.

Referring now to FIG. 1, depicted is an example method 100 for smart meal preparation using a sensor-enabled kitchen environment, in accordance with embodiments of the present disclosure. Method 100 can include more or fewer operations than those depicted. Method 100 can include operations in different orders than those depicted. In some embodiments, method 100 can be performed by a meal preparation assistant system which can include a sensor-enabled kitchen environment (such as sensor-enabled kitchen environment 200 depicted in FIG. 2), a natural language processing system (such as natural language processing system 300 depicted in FIG. 3), and/or by a computer system (such as computer system 400 depicted in FIG. 4).

From start 102, method 100 proceeds to operation 104 where the meal preparation assistant system receives recipes for a meal. A meal can include multiple dishes (e.g., a main course, a side dish, a dessert, etc.). In some embodiments, more than one meal can be prepared simultaneously (including multiples of the same meal for more than one person, or different meals for more than one person such as may occur at a restaurant). A meal preparation assistant system can receive recipes for a meal due to user input, such as by inputting a recipe into a computer (including a mobile phone, tablet, laptop, or other computer device). This can also occur by a user selecting one or more recipes from a menu, scanning a printed copy of a recipe or cookbook, or providing a website address to a website containing a recipe. These examples are provided as nonlimiting examples and many other possible ways in which a meal preparation assistant system can receive recipes exist and are contemplated by this disclosure.

For example, at 104, the meal preparation assistant system can receive recipes for a meal which includes roast beef, pasta with meat sauce, and a fruit and vegetable salad. In this example embodiment, there is one meal comprised of three dishes.

At 106, the meal preparation assistant system analyzes the recipes received at 104 for ingredients. This can involve using a natural language processing system (such as natural language processing system 300 depicted in FIG. 3) or other means for identifying keywords in the recipes and determining which portions of the recipes are ingredients. In uses where multiple recipes are analyzed, they can be analyzed together to determine total amounts of ingredients (such as where multiple dishes have overlapping ingredients) or separately to allow for a user to separate out which ingredients will be required for each dish. In some embodiments, pictorial recipes can be used, and a visual recognition system can identify depicted ingredients. However, a pictorial recipe may require manual input as determining ingredients for something like a sauce may not be possible from images alone. In some embodiments, a user can be presented with the determined ingredients and have an opportunity to adjust the automatically analyzed ingredients for correctness.

Continuing with the above example, at 106, the meal preparation assistant system can analyze the received recipes for the roast beef, pasta with meat sauce, and a fruit and vegetable salad for their ingredients. In this example embodiment, the roast beef dish may include ingredients of the beef and the seasonings to be applied to the beef; the pasta dish may include ingredients of noodles, meat for the sauce, the sauce base, and the sauce's spices; and the fruit and vegetable salad may include ingredients of the various fruits and vegetables to be mixed into a salad (e.g., honeydew, cantaloupe, watermelon, cucumber, bell peppers, cherry tomatoes, etc.).

At 108, the meal preparation assistant system analyzes the recipes for meal preparation steps. Meal preparation steps can include activities such as mixing ingredients together, cooking ingredients, letting ingredients sit (e.g., to allow bread to rise), or any other activity involved in preparing food. Meal preparation steps can also include washing dishes, which can be important in embodiments where the same utensils and/or cookware is required to be used more than once during method 100. The analyzing of the recipes can involve using a natural language processing system (such as natural language processing system 300 depicted in FIG. 3) or other means for identifying keywords in the recipes and determining which portions of the recipes are meal preparation steps. This can include analyzing the recipes for active verbs as keywords such as heat, cool, mix, stir, etc. In some embodiments, a user can be presented with the determined meal preparation steps and have an opportunity to adjust the automatically analyzed meal preparation steps for correctness. In some embodiments, operations 104 and 106 can be performed simultaneously.

Continuing with the above example, at 108, the meal preparation assistant system can analyze the received recipes for the roast beef, pasta with meat sauce, and a fruit and vegetable salad for their steps. The meal preparation steps for the roast beef can include mixing the seasonings for the roast beef (5 minutes), applying the seasonings (2 minutes), and cooking the roast beef in a slow cooker (6 hours). The meal preparation steps for the pasta with meat sauce can include boiling water for the pasta (7 minutes), cooking the pasta (10 minutes), cooking the meat for the sauce (12 minutes), and preparing the sauce base and seasonings (10 minutes). The meal preparation steps for fruit and vegetable salad can include washing the fruits and vegetables (5 minutes), chopping each of the fruits and vegetables (13 minutes), and combining the fruits and vegetables into a serving bowl (2 minutes).

At 110, the meal preparation assistant system receives sensor input from the sensor-enabled kitchen environment. This can be received from sensor-enabled kitchen environment 200 depicted in FIG. 2. This can include receiving the locations of one or more utensils, cookware, appliances, and/or kitchen locations. Utensils can include various kitchen utensils such as spoons, knives, forks, spatulas, ladles, etc. Cookware can include various items used in cooking such as pots, pans, bowls, cups, plates, cutting boards, etc. Appliances can include any number of kitchen appliances such as stoves, ovens, blenders, refrigerators, freezers, toasters, crock pots, dishwashers, etc. Kitchen locations can include places such as sinks, countertops, tables, islands, stovetops, or other places where meal preparation activities can occur. In some embodiments, a visual recognition service such as, but not limited to, IBM Watson® Vision Recognition can be used to evaluate a kitchen layout or items found within the kitchen. These example items and places are provided for exemplary purposes and are not to be read as limiting; many other types of utensils, cookware, appliances, and kitchen locations can exist in embodiments.

These items and places can be determined and tracked using sensors such as smart tags or RFID tags, and their locations can be tracked as they are used and moved from one kitchen location to another. In some embodiments, one or more cameras can be used with visual recognition software to identify and/or track these various items and locations. Receiving sensor input at 110 can include determining which of these various items and locations are currently present in the kitchen environment and where they are located. In some embodiments, whether the items are currently clean and/or ready for use can also be tracked by the sensors.

At 112, the meal preparation assistant system determines a meal preparation order. The meal preparation assistant system can use the results from the previous operations (the ingredients from the recipes at 106, the meal preparation steps at 108, and the sensor input from 110) to synthesize a meal preparation order. This can include determining which of the meal preparation steps should be prepared in order, which ingredients are needed for each step, which utensils/cookware/appliances are needed for each step, and where the meal preparation steps should occur at which kitchen locations. Additionally, the meal preparation assistant system can use the results of the previous operations to determine additional factors which can impact meal preparation such as determining whether one or more utensils/cookware/appliances will be used in multiple steps such that they need to be washed between uses, lengths of time which one or more of the dishes of the meal can or should be allowed to sit before serving, lengths of time which one or more of the dishes of the meal can or should be served before in order for the dishes to be fresh or at a preferred level of freshness (e.g., apples should not be cut a certain time period before serving or they will develop an unappealing brown color), lengths of time one or more of the dishes of the meal will remain warm for without external heat, and other such factors which impact meal preparation and serving.

Continuing with the above example, at 112, the meal preparation assistant system can determine that the mixing the seasonings for the roast beef (5 minutes), applying the seasonings (2 minutes), and cooking the roast beef in a slow cooker (6 hours) must occur first (and in order) due to the cooking time of the slow cooking step. The meal preparation assistant system can determine a bowl and mixing spoon in the kitchen environment for the mixing of the seasonings and a slow cooker appliance in the kitchen environment in which to cook the meat. The meal preparation assistant system can determine that the same mixing bowl will be required later during meal preparation and that a meal preparation step of washing the bowl occur between its use for the beef seasonings and for its use in preparing the sauce seasonings.

The meal preparation assistant system can determine that next the pasta with meat sauce should be prepared. Due to the total time of the pasta taking 17 minutes (boiling the water taking 7 minutes and cooking the pasta taking 10 minutes), the system can determine that the water should be started to be heated next. While waiting for the water to boil, the system can determine that the user can being cooking the meat for the sauce and preparing the sauce base and seasonings, each in turn. While these are each cooking, the system can determine the next meal preparation step is adding the pasta to the boiling water. The system can determine additional steps of turning off the heat from the sauce, meat, and pasta upon each portion of the pasta dish becoming fully cooked. The system can determine appropriate pots, pans, and utensils to use for each portion of the pasta dish and that the appropriate kitchen location for these steps is at the stovetop.

The system can determine that these portions of the pasta dish can be left on the stovetop to simmer with minimal heat to keep them warm until mealtime, with the next meal preparation step being washing the fruits and vegetables for the salad. Following washing, the next meal preparation steps can be cutting the fruits and vegetables and mixing the fruits and vegetables. The system can determine one or more bowls, knives, and cutting boards to use in cutting and storing the fruits and vegetables during preparation. The system can determine the appropriate place for these steps is at the sink and at a counter next to the sink where the user can wash the fruits and vegetables and cut the fruits and vegetables. Because the cut fruits and vegetables will lose freshness and be less appetizing if prepared earlier, the system can determine that this dish should be prepared last. Using the determined durations for each of the steps, the system can determine start and end times for each of the steps. For instance, in this example situation, a break in time for meal preparation steps may be included between cooking the roast beef in the slow cooker and other meal preparation steps, if the other steps are not calculated to consume the entire estimated 6 hours of cooking the roast beef in the slow cooker. In other words, the end time for one meal preparation step need not be immediately followed by a start time for a next subsequent meal preparation step.

At 114, the meal preparation assistant system can output a meal preparation plan. This plan can be based on the meal preparation order determined at 112. This can take the form of a step by step list of which tasks to perform at which times and can include details including which ingredients, utensils, cookware, and appliances to gather and use at various kitchen locations for each task involved in the meal preparation. In embodiments where more than one user is involved (e.g., two or more cooks), this can be separated into more than one plan with one plan for each user or can be one combined plan. The number of users involved can be defined by a user input to the system. The meal preparation plan can include tasks and directions beyond those involved in explicitly preparing the meal, including directions to move from one kitchen area to the next as appropriate and tasks for cleaning dishes and/or kitchen locations as needed. The meal preparation plan can be output in various formats in embodiments. In some embodiments the plan can be displayed using a text-based format, such as words displayed on computer printout or displayed on a device such as a mobile phone, tablet, laptop, television screen, etc. In some embodiments, the meal preparation plan can be presented to the user in an audio format including directions given to the user in real time using speakers, including a smart speaker such as, but not limited to, Amazon Echo®, Google Home®, etc. In embodiments using a smart speaker, a text to speech service such as, but not limited to, IBM Watson® Text to Speech can be used to provide voice commands to the user based on a textual plan. In some embodiments, the meal preparation assistant system can receive commands from the user using voice commands including such commands as to repeat directions, skip or delay a task, or to otherwise modify the plan. In some embodiments, the meal preparation assistant system can receive such user feedback and update one or more parameters of the meal preparation plan based on the user feedback.

At 116, the meal preparation assistant system can monitor meal preparation. This can involve receiving new sensor input for the kitchen environment, which can be updated on a regular basis or can be constantly updated in real time. This can also include receiving user feedback or input on which tasks have been completed. This can be used to assess whether the plan is being followed such that the meal preparation will complete in line with a user inputted time for completion. This can also be used to provide reminders to a user that certain tasks need to be completed. In some embodiments, the meal preparation assistant system can receive feedback and incorporate this feedback into future performances of method 100. This can include gathering information on the time required by the user to perform various tasks.

At 118, based on the monitoring of the meal preparation at 116, the meal preparation assistant system can determine whether a deviation from the meal plan is detected. This can be one or more tasks being performed in an incorrect order, using one or more ingredients, utensils, cookware, or appliances that were not planned to be used, or any other deviation from the meal preparation plan. In some embodiments, this can be limited to detecting deviations which will affect a task yet to be performed in the meal preparation plan. For example, if a utensil was used which was not part of the plan, but is not planned to be used in any future step of the plan, this deviation can be immaterial and not necessitate any updating of the meal preparation plan; whereas if e.g. a spatula is used in one step and will require washing before it is used in the later step where it was planned to be used, a deviation can be material.

Continuing with the above example, the meal preparation assistant system can use the sensor-enabled kitchen environment to determine that after the water was started heating for the pasta, the user took longer than planned to prepare the sauce base and seasonings and delayed putting the pasta in the boiling water.

At 120, the meal preparation assistant system can provide an updated meal preparation plan. In some embodiments, this can include updating the entire meal preparation plan, while in other embodiments, the meal preparation assistant system may only update a portion of the plan as appropriate. This update can be based on the monitoring of the meal preparation from 116 and the plan deviation detected at 118. The updating can be based on one or more occurrences in the sensor-enabled kitchen environment that was not part of the original meal preparation plan or which did not occur in the manner originally planned. In this way, the meal preparation assistant system can provide additional guidance to a user in preparing a meal even when it does not go according to plan. In some embodiments, in addition to updating the meal preparation plan, the system can save this data for use in future occurrences of method 100 such that additional time (or reduced time) is allotted for various tasks based on the current (and past) execution of method 100.

Continuing with the example, the meal preparation assistant system can direct the user to turn the heat down on the slow cooker such that the beef roast does not overcook in the additional time required to complete the meal preparation and update the timeline for preparing the fruit and vegetable salad. The meal preparation assistant system can save this data and allow additional time for preparation of sauces and seasonings in the future.

After providing an updated meal preparation plan at 120, method 100 can return to 116 to continue monitoring the meal preparation. This can continue until no material plan deviations are detected and the meal is complete, at which time method 100 can end at 122.

Figure 2:
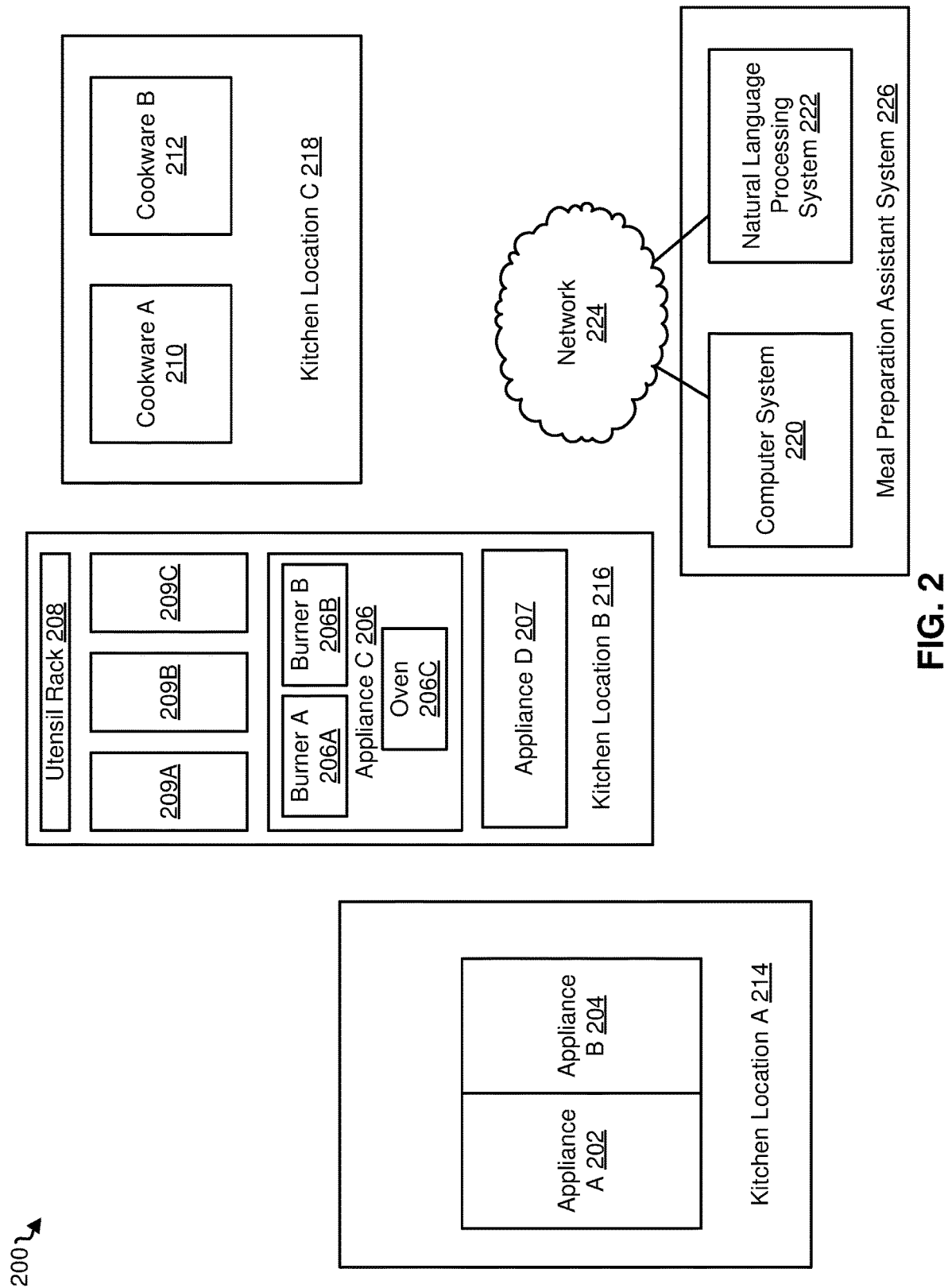
FIG. 2 depicts an example sensor-enabled kitchen environment, in accordance with embodiments of the present disclosure.

Referring now to FIG. 2, depicted is an example sensor-enabled kitchen environment, in accordance with embodiments of the present disclosure. FIG. 2 shows a sensor-enabled kitchen environment 200 which includes appliances A, B, C, and D (202, 204, 206, and 207, respectively), utensil rack 208 with utensils 209A, 209B, and 209C, cookware A and B (210 and 212 respectively), kitchen locations A, B, and C (214, 216, and 218, respectively), a meal preparation assistant system 226 including computer system 220 and natural language processing system 222, and network 224. Sensor environment 200 can be more or less complicated in embodiments, including additional appliances, utensils, cookware, kitchen locations, computers, or the like. Additionally, one or more components may be combined or omitted in embodiments.

Appliances A, B, C, and D (202, 204, 206, and 207, respectively) can be any kitchen appliances in embodiments, but as depicted here Appliance A is a freezer, Appliance B is a refrigerator, Appliance C is a stove, and Appliance D is a toaster. Appliances A and B (202 and 204) are present in Kitchen Location A (214) and can each be equipped with a sensor such as a smart tag. Appliances C and D (206 and 207) are present in Kitchen Location B (216) and can also be equipped with a sensor such as a smart tag. Appliance C (206) contains three sub-parts, a burner A (206A), a burner B (206B), and an oven (206C). In some embodiments, an appliance, such as Appliance C, with multiple subparts can have more than one sensor or one sensor can relay information regarding all of the subparts. In some embodiments, a meal preparation plan can include detail on which portion of an appliance to use for a meal preparation step. For example, a direction to cook a dish on a larger of two stove burners (e.g., burner B (206B)). While some appliances will be immobile or infrequently moved, other appliances such as Appliance D can be present in other kitchen locations at different times. The kitchen enabled sensor environment can use the sensors attached to the appliances to monitor which kitchen locations they are present in for use in determining a meal preparation plan (or in some embodiments can use one or more cameras to determine where the appliances are).

Utensil rack 208 can hold various utensils 209A, 209B, and 209C (collectively utensils 209). Each of utensils 209 can be equipped with a sensor such as a smart tag such that their locations can be tracked for use in determining a meal preparation plan. This can include monitoring which kitchen location they are present in (depicted here as present above the stove in Kitchen Location B (216)).

Also depicted is Kitchen Location C (218) which may be representative of a countertop upon which sits cookware A and B (210 and 212 respectively), each of which may similarly be equipped with a sensor.

Meal preparation assistant system 226 can be the same meal preparation assistant system used in performance of method 100 of FIG. 1. It can include computer system 220, which can also be consistent with computer system 400 of FIG. 4 and can include natural language processing system 222. Computer system 220 can use the various sensor input from the appliances, utensils, cookware, etc. and their respective locations in Kitchen Locations A, B, and C (214, 216, and 218) in determining a meal preparation plan in accordance with method 100. Computer system 220 can be comprised of various components (not depicted), including input/output devices such as a keyboard, mouse, display, smart speaker, and other components. As depicted here, computer system 220 can be connected by network 224 to a natural language processing system 222, which may be present on a cloud-based system. In other embodiments, natural language processing system 222 can be a part of or otherwise connected to computer system 220. Network 224 can be the internet, a local area network (LAN), a company intranet, a combination of networks, or another network configuration. Natural language processing system 222 can be used in performance of method 100, particularly with regard to operations 106 and 108 involving analyzing recipes for ingredients and meal preparation steps. To reduce clutter, each of the sensor enabled appliances, utensils, and cookware are not depicted as connected to network 224 but can be connected wirelessly to the network in embodiments. In other embodiments, computer system 220 can broadcast one or more signals to the sensors and receive return signals from the sensors as appropriate.

Figure 3:
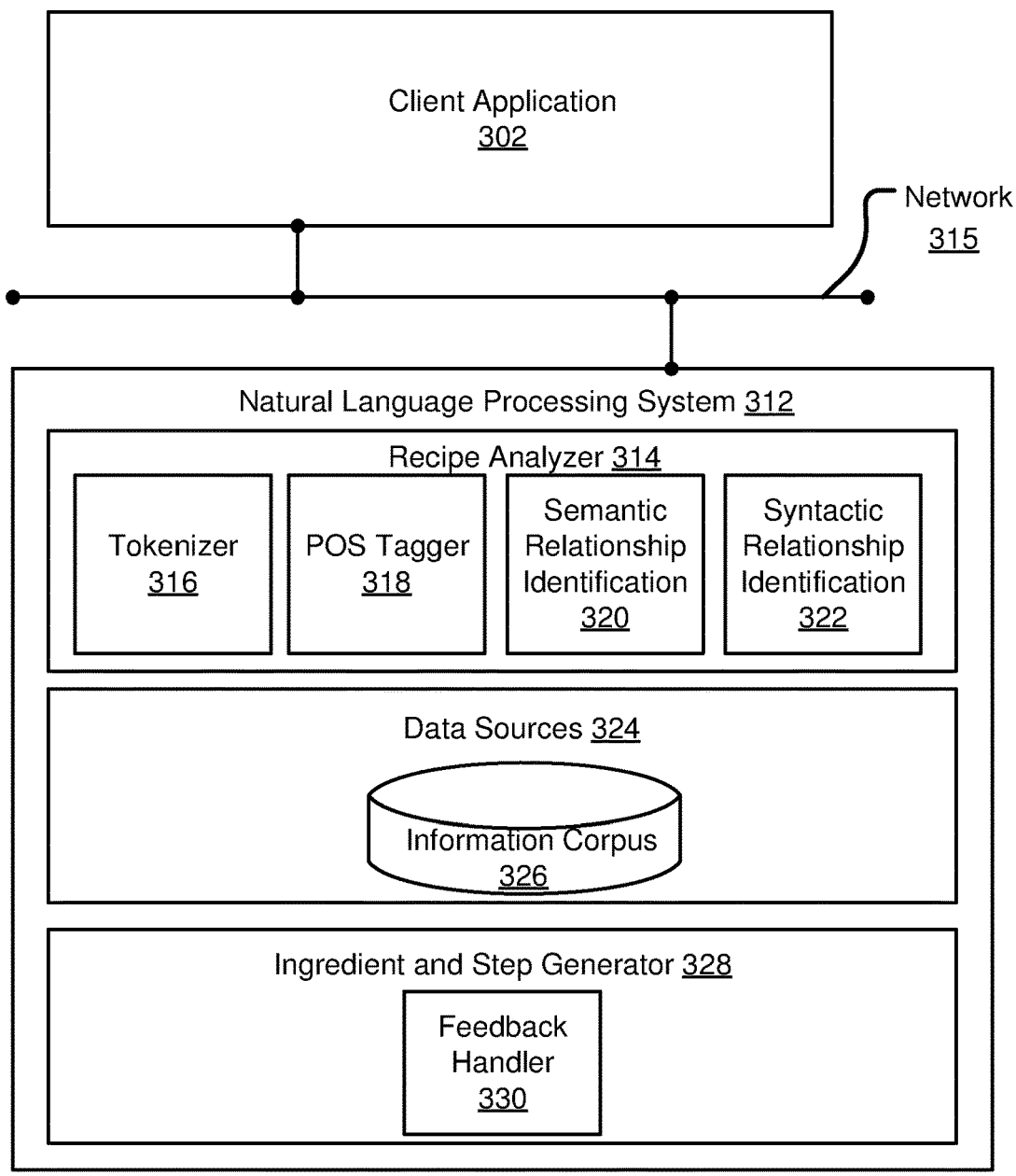
FIG. 3 depicts a natural language processing system, in accordance with embodiments of the present disclosure.

FIG. 3 depicts a natural language processing environment 300, in accordance with embodiments of the present disclosure. Aspects of FIG. 3 are directed toward an exemplary natural language processing environment 300 in performance of method 100, particularly with regard to operations 106 and 108 involving analyzing recipes for ingredients and meal preparation steps. Natural language processing environment 300 can be remote from the sensor-enabled kitchen environment and connected e.g., by cloud technology. In other embodiments, natural language processing environment 300 can be a part of or otherwise connected to a computer system, such as computer system 220 of FIG. 2 or computer system 400 of FIG. 4. In certain embodiments, one or more users may send recipes for analysis via a client application 302 to natural language processing system 312 using a remote device (such as computer system 220 of FIG. 2 or computer system 400 of FIG. 4). Natural language processing system 312 can perform methods and techniques for responding to the requests sent by one or more client application 302. In certain embodiments, the information received at natural language processing system 312 may correspond to input recipes received from users, where the input recipes may be expressed in a free form and in natural language.

In certain embodiments, client application 302 and natural language processing system 312 can be communicatively coupled through network 315 (e.g. the Internet, intranet, or other public or private computer network), which may be consistent with network 224 of FIG. 2. In certain embodiments, natural language processing system 312 and client application 302 may communicate by using Hypertext Transfer Protocol (HTTP) or Representational State Transfer (REST) calls. In certain embodiments, natural language processing system 312 may reside on a server node. Client application 302 may establish server-client communication with natural language processing system 312 or vice versa. In certain embodiments, the network 315 can be implemented within a cloud computing environment or using one or more cloud computing services. Consistent with various embodiments, a cloud computing environment can include a network-based, distributed data processing system that provides one or more cloud computing services.

Consistent with various embodiments, natural language processing system 312 may respond to information sent by client application 302 (e.g., recipes provided by users). Natural language processing system 312 can analyze the received recipes. In certain embodiments, natural language processing system 312 may include a recipe analyzer 314, data sources 324, and ingredient and step generator 328. Recipe analyzer 314 can be a computer module that analyzes the received recipes. In certain embodiments, recipe analyzer 314 can perform various methods and techniques for analyzing the recipes syntactically and semantically. In certain embodiments, recipe analyzer 314 can parse received recipes. Recipe analyzer 314 may include various modules to perform analyses of received recipes. For example, computer modules that recipe analyzer 314 may encompass include, but are not limited to, a tokenizer 316, part-of-speech (POS) tagger 318, semantic relationship identification 320, and syntactic relationship identification 322. In certain embodiments, the recipe analyzer 314 can include using a natural language processing technique.

Consistent with various embodiments, tokenizer 316 may be a computer module that performs lexical analysis. Tokenizer 316 can convert a sequence of characters into a sequence of tokens. Tokens may be string of characters typed by a user and categorized as a meaningful symbol. Further, in certain embodiments, tokenizer 316 can identify word boundaries in an input recipe and break the recipe or any text into its component parts such as words, multiword tokens, numbers, and punctuation marks. In certain embodiments, tokenizer 316 can receive a string of characters, identify the lexemes in the string, and categorize them into tokens.

Consistent with various embodiments, POS tagger 318 can be a computer module that marks up a word in a text to correspond to a particular part of speech. POS tagger 318 can read a recipe or other text in natural language and assign a part of speech to each word or other token. POS tagger 318 can determine the part of speech to which a word corresponds based on the definition of the word and the context of the word. The context of a word may be based on its relationship with adjacent and related words in a phrase, sentence, question, or paragraph. In certain embodiments, context of a word may be dependent on one or more previously provided recipes. Examples of parts of speech that may be assigned to words include, but are not limited to, nouns, verbs, adjectives, adverbs, and the like. Examples of other part of speech categories that POS tagger 318 may assign include, but are not limited to, comparative or superlative adverbs, wh-adverbs (e.g., when, where, why, whence, whereby, wherein, whereupon), conjunctions, determiners, negative particles, possessive markers, prepositions, wh-pronouns (e.g., who, whom, what, which, whose), and the like. In certain embodiments, POS tagger 316 can tag or otherwise annotate tokens of a recipe with part of speech categories. In certain embodiments, POS tagger 316 can tag tokens or words of a recipe to be parsed by natural language processing system 312.

Consistent with various embodiments, semantic relationship identification 320 may be a computer module that can identify semantic relationships of recognized identifiers in recipes provided by users. For example, the semantic relationship identification 320 may include identifying recognized identifiers such as location names, appliance types, cookware types, utensil types, brand names, ingredients, institutions, corporations, and other entities. In certain embodiments, semantic relationship identification 320 may determine functional dependencies between entities, the dimension associated to a member, and other semantic relationships.

Consistent with various embodiments, syntactic relationship identification 322 may be a computer module that can identify syntactic relationships in a recipe composed of tokens provided by users to natural language processing system 312. Syntactic relationship identification 322 can determine the grammatical structure of sentences, for example, which groups of words are associated as "phrases" and which word is the subject or object of a verb. In certain embodiments, syntactic relationship identification 322 can conform to a formal grammar.

In certain embodiments, recipe analyzer 314 may be a computer module that can parse a received recipe and generate a corresponding data structure of the recipe. For example, in response to receiving a recipe at natural language processing system 312, recipe analyzer 314 can output the parsed recipe as a data structure. In certain embodiments, the parsed recipe may be represented in the form of a parse tree or other graph structure. To generate the parsed recipe, recipe analyzer 314 may trigger computer modules 316-322. Recipe analyzer 314 can use functionality provided by computer modules 316-322 individually or in combination. Additionally, in certain embodiments, recipe analyzer 314 may use external computer systems for dedicated tasks that are part of the recipe parsing process.

Consistent with various embodiments, the output of recipe analyzer 314 can be used by natural language processing system 312 to perform a search of one or more data sources 324 to identify ingredients and meal preparation steps included in the recipe. In certain embodiments, data sources 324 may include data warehouses, information corpora, data models, and document repositories. In certain embodiments, the data source 324 can be an information corpus 326. The information corpus 326 can enable data storage and retrieval. In certain embodiments, the information corpus 326 may be a storage mechanism that houses a standardized, consistent, clean and integrated form of data. The data may be sourced from various operational systems. Data stored in the information corpus 326 may be structured in a way to specifically address reporting and analytic requirements. In one embodiment, the information corpus may be a relational database. In some example embodiments, data sources 324 may include one or more document repositories.

In certain embodiments, ingredient and step generator 328 may be a computer module that generates a list of ingredients and a list of meal preparation steps for the recipe. Consistent with various embodiments, ingredient and step generator 328 may include a feedback handler 330.

In certain embodiments, feedback handler 330 can be a computer module that processes feedback from users on lists of ingredients and lists of meal preparation steps for the recipe generated by ingredient and step generator 328. In certain embodiments, users may be engaged in dialog with the natural language processing system 312 to evaluate the relevance of received lists of ingredients and lists of meal preparation steps. In certain embodiments, the feedback of users on these lists may be used for future natural language processing sessions.

The various components of the exemplary natural language processing system described above may be used to implement various aspects of the present disclosure. For example, the client application 302 could be used to receive one or more recipes. The recipe analyzer 314 could, in certain embodiments, use a natural language processing technique to analyze the recipes, and identify keywords and word relationships in the recipes. Further, the natural language processing system 312 could, in certain embodiments, compare the keywords to an information corpus 326 to determine which keywords are ingredients. The ingredient and step generator 328 can be used to formulate lists of ingredients and lists of meal preparation steps based on the recipes input to the natural language processing system 312.

Figure 4:
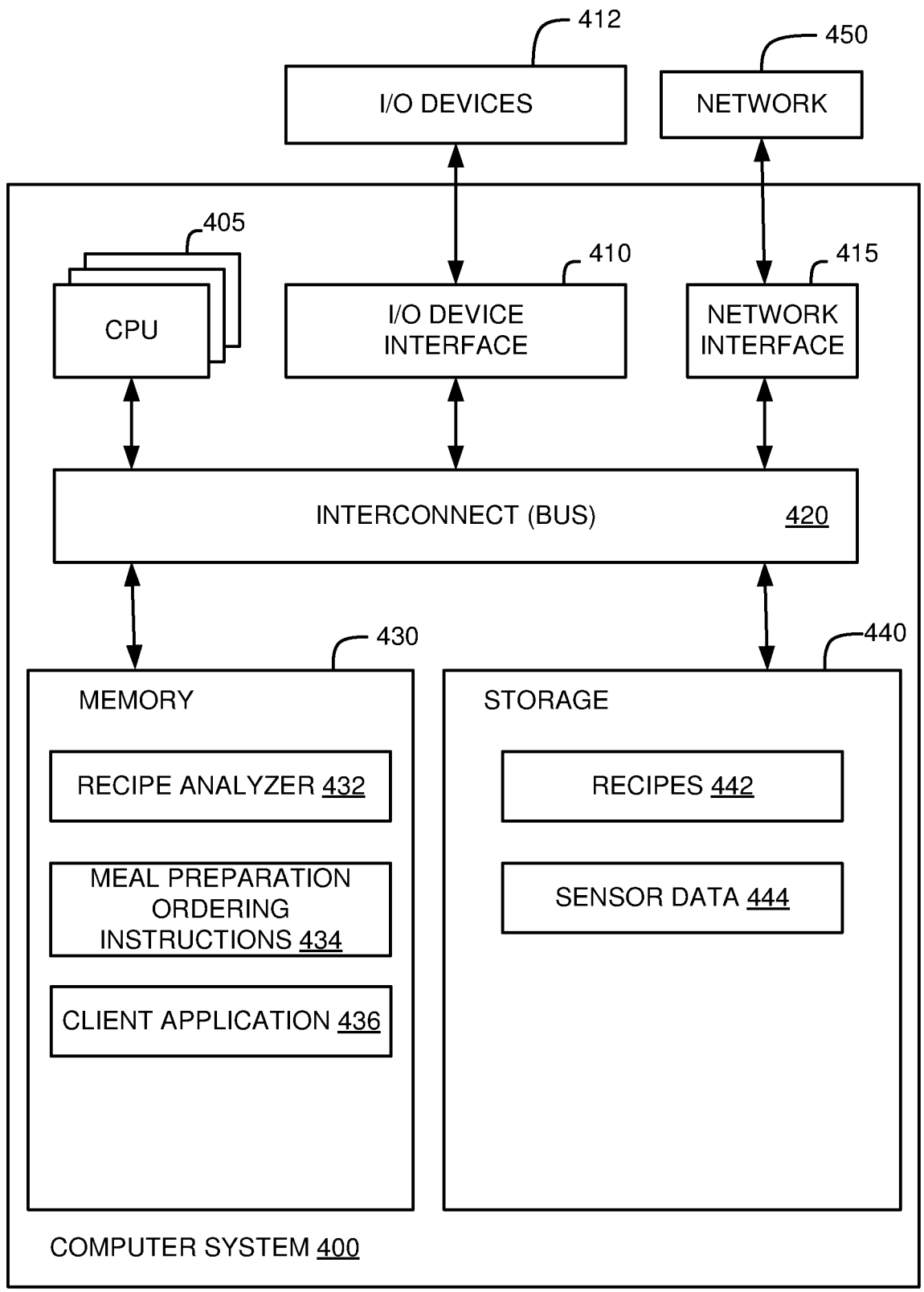
FIG. 4 illustrates a block diagram of a computer system, in accordance with some embodiments of the present disclosure.

Referring now to FIG. 4, illustrated is a block diagram of a computer system 400, in accordance with some embodiments of the present disclosure. In some embodiments, computer system 400 performs operations in accordance with FIG. 1 as described above. In some embodiments, computer system 400 can be consistent with computer system 220 of FIG. 2. The computer system 400 can include one or more processors 405 (also referred to herein as CPUs 405), an I/O device interface 410 which can be coupled to one or more I/O devices 412, a network interface 415, an interconnect (e.g., BUS) 420, a memory 430, and a storage 440.

In some embodiments, each CPU 405 can retrieve and execute programming instructions stored in the memory 430 or storage 440. The interconnect 420 can be used to move data, such as programming instructions, between the CPUs 405, I/O device interface 410, network interface 415, memory 430, and storage 440. The interconnect 420 can be implemented using one or more busses. Memory 430 is generally included to be representative of a random access memory (e.g., static random access memory (SRAM), dynamic random access memory (DRAM), or Flash).

In some embodiments, the memory 430 can be in the form of modules (e.g., dual in-line memory modules). The storage 440 is generally included to be representative of a non-volatile memory, such as a hard disk drive, solid state device (SSD), removable memory cards, optical storage, or flash memory devices. In an alternative embodiment, the storage 440 can be replaced by storage area-network (SAN) devices, the cloud, or other devices connected to the computer system 400 via the I/O devices 412 or a network 450 via the network interface 415.

The CPUs 405 can be a single CPU, multiple CPUs, a single CPU having multiple processing cores, or multiple CPUs with one or more of them having multiple processing cores in various embodiments. In some embodiments, a processor 405 can be a digital signal processor (DSP). The CPUs 405 can additionally include one or more memory buffers or caches (not depicted) that provide temporary storage of instructions and data for the CPUs 405. The CPUs 405 can be comprised of one or more circuits configured to perform one or more methods consistent with embodiments of the present disclosure.

The memory 430 of computer system 400 includes recipe analyzer 432, meal preparation ordering instructions 434, and client application 436. Recipe analyzer 432 can be an application or compilation of computer instructions for analyzing one or more recipes. Recipe analyzer 432 can be a natural language processing system, such as natural language processing system 312 of FIG. 3 and/or a set of instructions for interfacing with such a system. Recipe analyzer 432 can analyze received recipes for ingredients and meal preparation steps.

Meal preparation ordering instructions 434 can be an application or compilation of computer instructions for determining an order for one or more meal preparation tasks in accordance with method 100 of FIG. 1 using ingredients and meal preparation steps derived from recipes and sensor data regarding a sensor-enabled kitchen environment to determine the order.

Client application 436 can be consistent with client application 302 of FIG. 3 and provide a means for a user to input recipes into computer system 400 and/or receive an outputted meal preparation plan. In some embodiments, client application 436 can receive user feedback. In some embodiments, client application 436 can provide an updated meal preparation plan in the event a plan deviation is detected.

Storage 440 contains recipes 442, sensor data 444, and feedback data 446. Recipes 442 can be recipes input into computer system 400 in any format including text recipes, scanned pages of cookbooks, a website address where the website contains a recipe, etc. Recipes 442 can be input into computer system 400 using client application 436 and can be analyzed using recipe analyzer 432.

Sensor data 444 can be various types of data which are received from sensors included in a sensor-enabled kitchen environment, such as that depicted in FIG. 2. This can include the locations of various utensils, cookware, and appliances in the kitchen environment. This can also include distances between various kitchen locations. Sensor data 444 can also include data regarding whether the various utensils, cookware, and appliances are clean or require washing before re-use.

In some embodiments as discussed above, the memory 430 stores recipe analyzer 432, meal preparation ordering instructions 434, and client application 436, and the storage 440 stores recipes 442, and sensor data 444. However, in various embodiments, each of the recipe analyzer 432, meal preparation ordering instructions 434, client application 436, recipes 442, and sensor data 444 are stored partially in memory 430 and partially in storage 440, or they are stored entirely in memory 430 or entirely in storage 440, or they are accessed over a network 450 via the network interface 415.

In various embodiments, the I/O devices 412 can include an interface capable of presenting information and receiving input. For example, I/O devices 412 can receive input from a user and present information to a user and/or a device interacting with computer system 400. In some embodiments, I/O devices 412 include one or more of sensors such as smart tags associated with one or more of the appliances, utensils, and/or cookware of FIG. 2. In some embodiments, I/O devices 412 can include a display and/or an audio speaker for presenting information to a user of computer system 400.

The network 450 can connect (via a physical or wireless connection) the computer system 400 with other networks, and/or one or more devices that interact with the computer system. In some embodiments, network 450 is consistent with network 224 of FIG. 2.

Logic modules throughout the computer system 400—including but not limited to the memory 430, the CPUs 405, and the I/O device interface 410—can communicate failures and changes to one or more components to a hypervisor or operating system (not depicted). The hypervisor or the operating system can allocate the various resources available in the computer system 400 and track the location of data in memory 430 and of processes assigned to various CPUs 405. In embodiments that combine or rearrange elements, aspects and capabilities of the logic modules can be combined or redistributed. These variations would be apparent to one skilled in the art.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
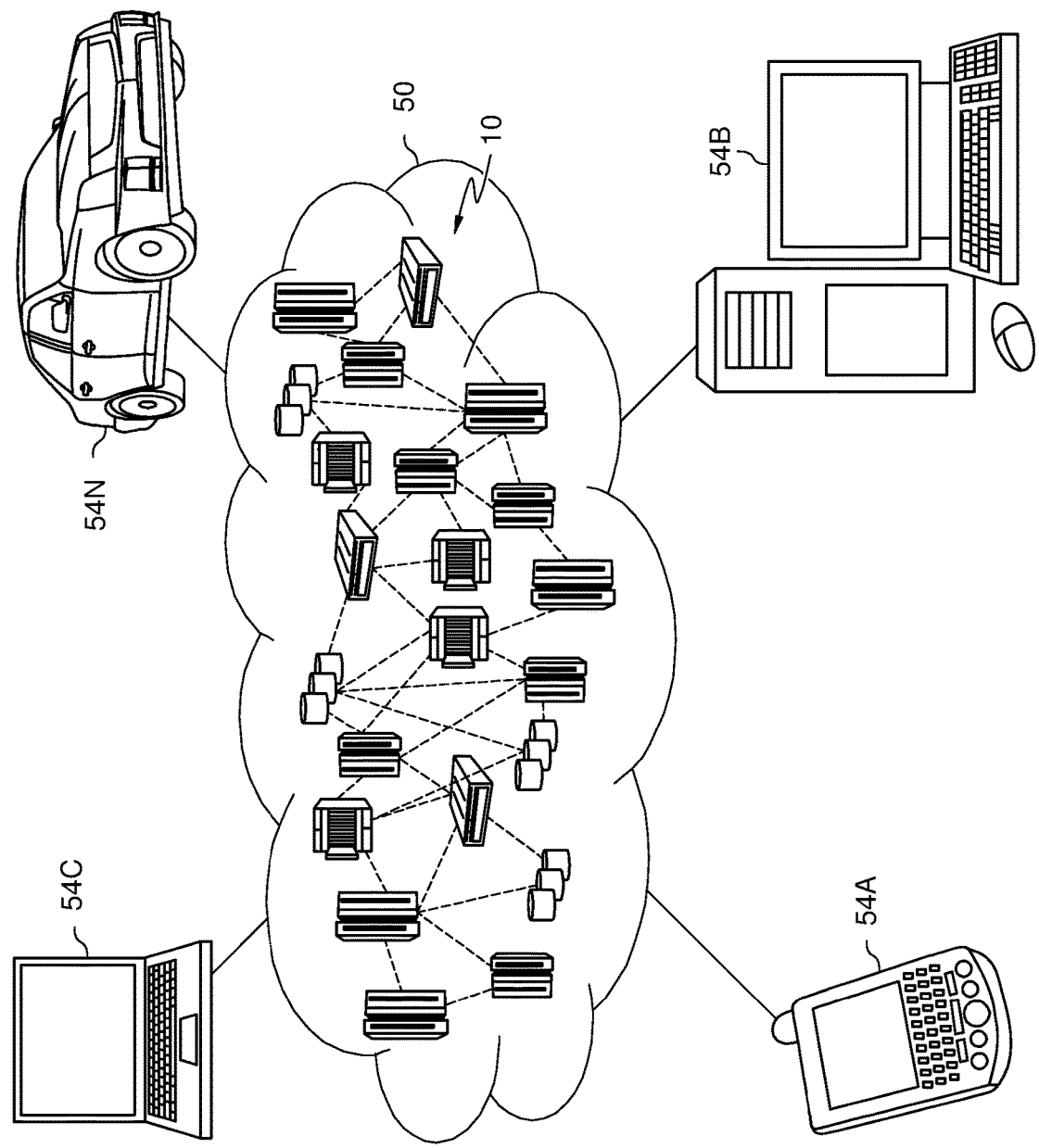
FIG. 5 depicts a cloud computing environment according to some embodiments of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and smart meal preparation processing 96. Smart meal preparation processing 96 can be a workload or function such as that described in FIG. 1 above. In other embodiments, only a portion of the processing of a smart meal preparation system may be cloud based, such as a natural language processing system as depicted in FIG. 3.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for smart meal preparation, the method comprising:
   receiving one or more recipes related to a meal;
   analyzing the one or more recipes using natural language processing to identify a plurality of ingredients of the one or more recipes;
   analyzing the one or more recipes using natural language processing to identify a plurality of steps to prepare each of the one or more recipes;
   receiving sensor input from at least one of a vision sensor, a smart tag and an RFID tag, to identify a kitchen layout including tracking locations movements and availability for use of a plurality of devices for preparing the one or more recipes;
   determining a plurality of parameters of a meal preparation plan based on the identified plurality of ingredients, the identified plurality of steps, and the identified kitchen layout, wherein the one or more parameters includes an order of meal preparation; and
   outputting the meal preparation plan to a user.

2. The method of claim 1, further comprising:
   receiving feedback regarding the meal preparation plan; and
   updating one or more of the plurality of parameters of the meal preparation plan based on the received feedback.

3. The method of claim 1, wherein determining the plurality of parameters of a meal preparation plan includes one or more of:
   determining a length of time one or more of the plurality of ingredients stay fresh; and
   determining a length of time at least a portion of the user-selected meal stays warm after preparation.

4. The method of claim 1, further comprising:
   monitoring meal preparation including receiving sensor input that includes updates to a location of one or more of the plurality of devices for preparing the one or more recipes.

5. The method of claim 4, further comprising:
   detecting, based on the monitoring, that the user has deviated from the meal preparation plan during preparation of the meal;
   updating the meal preparation plan based on the deviation; and
   providing the updated meal preparation plan to the user.

6. The method of claim 1, wherein the determined order of meal preparation includes instructions for multiple users, wherein the number of the multiple users is defined by user input.

7. The method of claim 1, wherein the outputting the determined order of meal preparation to the user is performed using a text to speech service.

8. The method of claim 1, wherein the meal preparation plan comprises instructions for generating multiple dishes, and wherein the instructions, when performed by the user, result in each of the multiple dishes being completed at approximately the same time.

9. The method of claim 1, wherein receiving the sensor input to identify the kitchen layout comprises:
receiving image data from a camera;
analyzing the image data using visual recognition to identify one or more of the plurality of devices found within the kitchen and to determine the kitchen layout.

10. The method of claim 9, wherein the sensor input further comprises RFID data received from the RFID tags on at least one of the plurality of devices in the kitchen, and wherein the method further comprises monitoring the RFID tags and the image data to track the location of the one or more devices in the kitchen as the user prepares the meal.

11. The method of claim 1, wherein analyzing the one or more recipes using natural language processing to identify the plurality of ingredients of the one or more recipes comprises:
generating a list of ingredients found in the recipe.

12. A system for smart meal preparation, the system comprising:
one or more processors;
one or more sensors; and
a memory communicatively coupled to the one or more processors,
wherein the memory comprises instructions which, when executed by the one or more processors, cause the one or more processors to perform a method comprising:
receiving one or more recipes related to a meal;
analyzing the one or more recipes using natural language processing to identify a plurality of ingredients of the one or more recipes;
analyzing the one or more recipes using natural language processing to identify a plurality of steps to prepare each of the one or more recipes;
receiving sensor input from at least one of a vision sensor, a smart tag and an RFID tag, to identify a kitchen layout including tracking locations movements and availability for use of a plurality of devices for preparing the one or more recipes;
determining a plurality of parameters of a meal preparation plan based on the identified plurality of ingredients, the identified plurality of steps, and the identified kitchen layout, wherein the plurality of parameters includes an order of meal preparation; and
outputting the meal preparation plan to a user.

13. The system of claim 12, further comprising:
receiving feedback regarding the meal preparation plan; and
updating one or more of the plurality of parameters of the meal preparation plan based on the received feedback.

14. The system of claim 8, further comprising:
monitoring meal preparation including receiving updates to a location of one or more of the plurality of devices for preparing the one or more recipes.

15. The system of claim 12, wherein the determined order of meal preparation includes instructions for multiple users, wherein the number of the multiple users is defined by user input.

16. The system of claim 12, wherein the outputting the determined order of meal preparation to the user is performed using a text to speech service.

17. A computer program product for smart meal preparation, the computer program product comprising a computer readable storage medium having program instructions embodied therewith, the program instructions executable by a computer to perform a method comprising:
receiving one or more recipes related to a meal;
analyzing the one or more recipes using natural language processing to identify a plurality of ingredients of the one or more recipes;
analyzing the one or more recipes using natural language processing to identify a plurality of steps to prepare each of the one or more recipes;
receiving sensor input from at least one of a vision sensor, a smart tag and an RFID tag, to identify a kitchen layout including tracking locations movements and availability for use of a plurality of devices for preparing the one or more recipes;
determining a plurality of parameters of a meal preparation plan based on the identified plurality of ingredients, the identified plurality of steps, and the identified kitchen layout, wherein the one or more parameters includes an order of meal preparation; and
outputting the meal preparation plan to a user.

18. The computer program product of claim 17, wherein determining the plurality of parameters of a meal preparation plan includes one or more of:
determining that one of the plurality of devices is to be washed between two or more of the plurality of steps;
determining a length of time one or more of the plurality of ingredients stay fresh; and
determining a length of time at least a portion of the user-selected meal stays warm after preparation.

19. The computer program product of claim 17, further comprising:
monitoring meal preparation including receiving updates to a location of one or more of the plurality of devices for preparing the one or more recipes.

20. The computer program product of claim 19, further comprising:
detecting, based on the monitoring, a deviation in the meal preparation plan; and
providing an updated meal preparation plan based on the deviation.

* * * * *